United States Patent
Jung

(10) Patent No.: US 9,496,777 B2
(45) Date of Patent: Nov. 15, 2016

(54) HAPTIC ACTUATOR

(71) Applicant: M2SYS. CO., LTD., Incheon (KR)

(72) Inventor: Bo Seung Jung, Incheon (KR)

(73) Assignee: M2SYS. CO., LTD. (KR)

( * ) Notice: Subject to any disclaimer, the term of this patent is extended or adjusted under 35 U.S.C. 154(b) by 17 days.

(21) Appl. No.: 14/391,235

(22) PCT Filed: Apr. 25, 2013

(86) PCT No.: PCT/KR2013/003584
§ 371 (c)(1),
(2) Date: Oct. 8, 2014

(87) PCT Pub. No.: WO2014/014187
PCT Pub. Date: Jan. 23, 2014

(65) Prior Publication Data
US 2015/0123500 A1 May 7, 2015

(30) Foreign Application Priority Data

Jul. 19, 2012 (KR) ........................ 10-2012-0078583

(51) Int. Cl.
| | | |
|---|---|---|
| *H02K 7/06* | (2006.01) | |
| *H02K 35/00* | (2006.01) | |
| *H04B 3/36* | (2006.01) | |
| *H02K 33/02* | (2006.01) | |
| *B06B 1/04* | (2006.01) | |
| *H02K 33/18* | (2006.01) | |

(52) U.S. Cl.
CPC ............... *H02K 33/02* (2013.01); *B06B 1/045* (2013.01); *H02K 33/18* (2013.01)

(58) Field of Classification Search
CPC ...... H02K 33/02; H02K 33/04; H02K 33/06; H02K 33/08; B06B 1/045
USPC .......... 310/12.16, 14, 15, 17, 25, 26, 80, 81; 340/407.1
See application file for complete search history.

(56) References Cited

U.S. PATENT DOCUMENTS

| | | | | |
|---|---|---|---|---|
| 5,903,076 A | * | 5/1999 | Suyama | B06B 1/045 310/13 |
| 2010/0052578 A1 | * | 3/2010 | Kim | B06B 1/045 318/114 |
| 2011/0193426 A1 | * | 8/2011 | Chung | H02K 33/16 310/25 |

FOREIGN PATENT DOCUMENTS

| | | |
|---|---|---|
| JP | 2006007161 | 1/2006 |
| KR | 1020080107506 | 12/2008 |

(Continued)

OTHER PUBLICATIONS

International Search Report—PCT/KR2013/003584 dated Aug. 6, 2013.

*Primary Examiner* — Terrance Kenerly
*Assistant Examiner* — Ahmed Elnakib
(74) *Attorney, Agent, or Firm* — Cantor Colburn LLP

(57) ABSTRACT

An haptic actuator includes: a base member; a hollow cylindrical coil arranged in the upper portion of the base member; a core formed in the base member and arranged so as to be inserted into the center of the coil; a cover member covering the upper portion of the base member; a vibration plate mounted on the cover member, arranged in the upper portion of the core, and moving in the vertical direction; and a vibration unit coupled to the vibration plate and spaced apart from the upper portion of the core. The vibration plate has a mounting portion fixedly mounted on the central area of the cover member and a coupling portion formed so as to extend from the mounting portion and be bent in the downward direction. The vibration unit has a permanent magnet coupled to the coupling portion and spaced apart from the core.

2 Claims, 3 Drawing Sheets

(56) References Cited

FOREIGN PATENT DOCUMENTS

| KR | 1020100136390 | | 12/2010 |
|---|---|---|---|
| KR | 1020110035754 | | 4/2011 |
| KR | 1020110047525 | | 5/2011 |
| KR | 2012-0020485 | * | 3/2012 |
| KR | 1020120020485 | | 3/2012 |

* cited by examiner (a)

(b)

(c)

HAPTIC ACTUATOR

TECHNICAL FIELD

The present invention relates to a haptic actuator, and more particularly to a haptic actuator which is embedded in an electronic device, such as a portable terminal, which generates vibrations, and generates vibrations through a mutual operation of a coil and a magnet.

BACKGROUND ART

In general, bell sounds and vibrations are used to receive a call in a portable terminal such as a mobile phone.

For vibrations, a small-sized vibration generation unit should be driven to transfer a driving force to a case of the device such that the entire terminal can vibrate.

A vibration generation unit, which is one of call reception units applied to a portable terminal such as a mobile phone, is a component for converting electrical energy into mechanical vibrations using a principle of generating an electromagnetic force, and is mounted to the portable terminal for a call alarm without using sounds.

The vibration generation unit is widely used for the purpose of informing a user of reception of a call in a portable terminal, and has recently been mounted to a game unit to inform the user of a process state of a game or mounted to a touch phone and the like to be used for the purpose of allowing the user to feel that a key is touched.

As the portable terminal market is rapidly expanding and various functions are being added to the portable terminal, a need for development of a product of a new structure which can improve disadvantages of an existing vibration generation units and remarkably improve quality is rising in a situation requiring miniaturization and high quality of components of the portable terminal.

A vibration generation unit mounted to a portable terminal according to the related art basically primarily uses a vibrometer, and a weight body is attached to a resilient body such as a coil spring and a coil for vibrating the weight body is provided.

If a current is applied to the coil, the weight body vibrates according to predetermined frequency response characteristics due to the resilient coefficients of the weight body and the resilient body.

As described above, the recently released portable terminal outputs sounds or vibrations in response to a touch input of the user to provide a function of providing a feedback corresponding to an input for the user.

In particular, for the portable terminal employing a haptic technology, studies on vibration generation units for generating various types of vibrations to provide various haptic feedbacks in response to various inputs are being conducted, and Korean Patent Application Publication No. 10-2008-0107506 discloses such a vibration generation unit.

However, the vibration generation unit according to the related art generates a vertical driving force of a weight body with a Lorentz's force generated between a coil and a fixed magnet, but it has been difficult to show good characteristics in the strengths of vibrations and frequency bands of vibrations due to a limit in the vibration generation unit due to the Lorentz's force.

In addition, because the vibration generation unit according to the related art has a structure in which a permanent magnet included in a weight body moves in a fixed coil, a possibility of collision of a coil and a permanent magnet is high, causing noise and short-circuiting the coil, and it is difficult to dispose the permanent magnet in the coil such that a predetermined interval is provided between the permanent magnet and the coil when the product is assembled.

DISCLOSURE

Technical Problem

The present invention has been made in an effort to solve the above-mentioned problems, and it is an objective of the present invention to provide a haptic actuator which can be easily assembled while having a simple structure and generate a strong electromagnetic force by mounting a fixed core at a central portion of a hollow coil and disposing a permanent magnet at an upper portion of the core.

Technical Solution

In accordance with an aspect of the present invention, there is provided a haptic actuator including: a base member; a hollow cylindrical coil disposed at an upper portion of the base member; a core formed in the base member and inserted into and disposed at the center of the coil; a cover member covering an upper portion of the base member; a vibration plate mounted to the cover member, disposed at an upper portion of the core, and configured to vertically move; and a vibration part coupled to the vibration plate and spaced apart from an upper portion of the core, wherein the core has a through-hole vertically passing through the core, wherein the vibration plate includes: a mounting part fixedly mounted to a central area of the cover member; and a coupling part extending from an outside of the mounting part to be bent downwards, and to which the vibration part is coupled, wherein the vibration part includes: a weight body having a hollow cylindrical shape and coupled to the coupling part to surround the coil while being spaced apart from an outer peripheral surface of the coil; and a permanent magnet coupled to a central portion of the weight body to be spaced apart from the mounting part and the core between the mounting part and the core and having a width equal to or larger than the width of the core such that the width of the permanent magnet is larger than the width of the through-hole, wherein the core is formed of a magnetic substance such that an attractive force is generated between the core and the permanent magnet vertically facing each other while a current to the coil is blocked, and wherein the vibration part vertically vibrates while resiliently deforming the coupling part if the direction of ab current applied to the coil is changed.

The vibration part includes a weight body coupled to the vibration plate, and the weight body is coupled to the coupling part and the permanent magnet is coupled to the weight body to be spaced apart from the mounting part and the coil between the mounting part and the coil.

The weight body has a hollow cylindrical shape and is disposed to surround the coil while being spaced apart from an outer peripheral surface of the coil, and the permanent magnet is disposed at a central portion of the weight body.

The core has a through-hole which vertically passes through the core, and the width of the permanent magnet is larger than the width of the through-hole.

The width of the permanent magnet is equal to or larger than the width of the core.

An impact absorption member is mounted on a lower surface of the permanent magnet or an upper surface of the core.

Advantageous Effects

The above-described haptic actuator according to the present invention has the following effects.

Because a core is mounted to a central portion of a hollow coil and a permanent magnet is disposed at an upper portion of the core, the permanent magnet is not disposed within the coil and it is unnecessary to constantly maintain an interval between the permanent magnet and the coil, whereby the structure of the haptic actuator can become simple, the haptic actuator can be easily assembled, and a strong electromagnetic force can be generated by the core.

Further, because a mounting part is fixedly mounted to a central area of a cover member and a coupling part is bent downwards at an outside of the mounting part to be resiliently deformed upwards and downwards, a space for installing a coil and a vibration part can be secured between a vibration plate and a base member.

Furthermore, the linear vibration generation unit according to the present invention can improve vibration characteristics such as the strengths of vibrations and the frequency bands of vibrations, and can minimize a problem such as short-circuit of a coil as the permanent magnet is vertically moved at an upper portion of the core.

In addition, because an impact absorption member is mounted on a lower surface of the permanent magnet or an upper surface of the core, noise due to a collision of the permanent magnet and the core can be prevented when the permanent magnet is vertically moved.

BEST MODE

Mode for Invention

Figure 1:
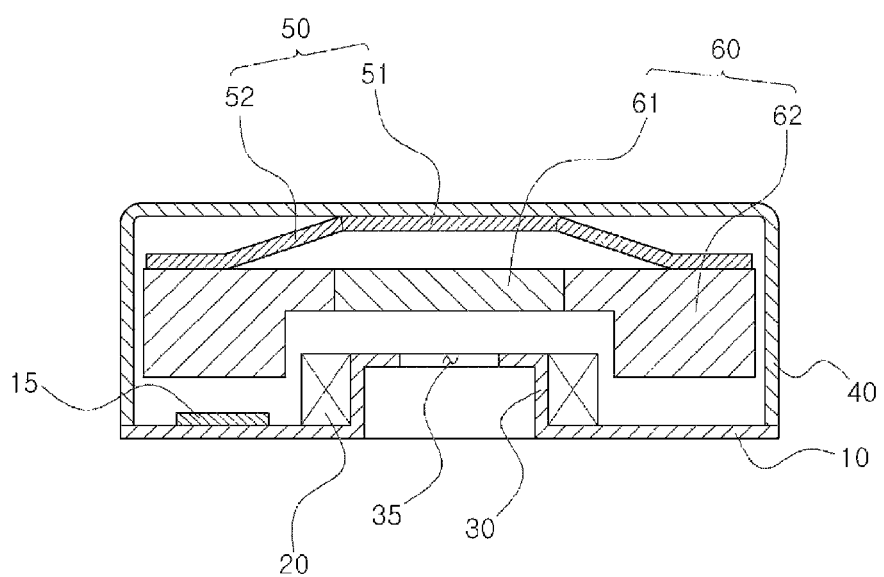
FIG. 1 is a sectional view of a haptic actuator according to an embodiment of the present invention.

As shown in FIG. 1, a haptic actuator according to the present invention includes a base member 10, a coil 20, a core 30, a cover member 40, a vibration plate 50, and a vibration part 60.

The base member 10 has a flat plate shape, and a circuit board 15 for applying a current to the coil 20 is mounted on an upper surface of the base member 10.

The coil 20 is wound to have a hollow cylindrical shape and is disposed at central portion of an upper side of the base member 10.

The core 30 is formed of a magnetic substance, and fixedly coupled to an upper surface of the base member 10 and is inserted into and disposed at the center of the coil 20.

The core 30 may be manufactured separately from the base member 10 and fixedly coupled to an upper surface of the base member 10, and as in the embodiment of the present invention, the core 30 may be formed by convexly bending a central portion of the base member 10 upwards.

The core 30 may be easily manufactured by upwardly protruding the central portion of the base member 10 such that the core 30 is integrally formed with the base member 10 as in the embodiment of the present invention.

A through-hole 35 vertically passes through the core 30.

Then, the width of a permanent magnet 61 constituting the vibration part 60 is larger than the width of the through-hole 35.

Preferably, the width of the permanent magnet 61 is equal to or larger than the width of the core 30.

As the through-hole 35 is formed in the core 30 as described above, the permanent magnet 61 can be prevented from being lowered to contact an upper surface of the core 30 by a magnetic force generated by the permanent magnet 61 while a current is applied to the coil 20.

Figure 2:
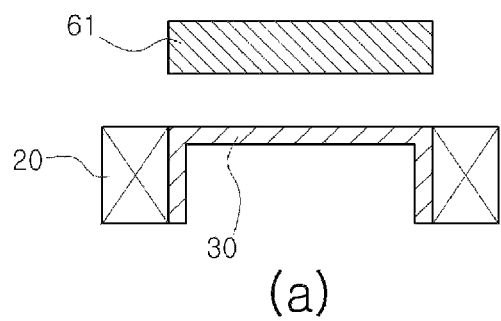
FIG. 2 shows views for explaining a structure of the haptic actuator according to the embodiment of the present invention.
Figure 2:
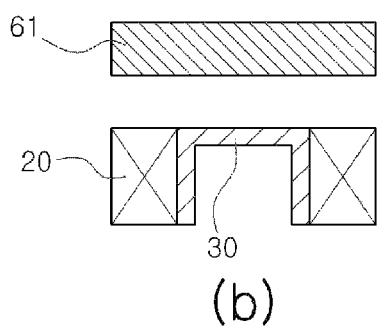
Figure 2:
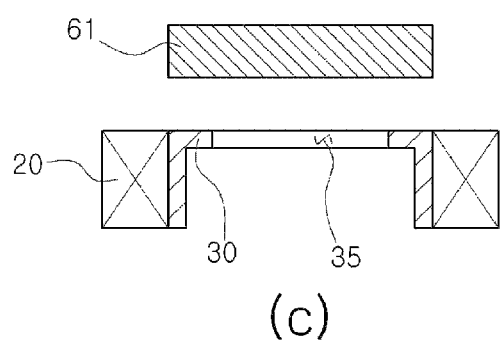

If the core 30 does not have the through-hole 35 as shown in (a) of FIG. 2, an area where an upper surface of the core 30 and the permanent magnet 61 face each other becomes larger such that an attractive force between the permanent magnet 61 and the core 30 becomes higher, so that the permanent magnet 61 may be lowered to contact the core 30 in a free state, causing deformation of the vibration plate 50 when this state continues for a long time.

When the size of the core 30 is made small as shown in (b) of FIG. 2 to decrease an attractive force between the permanent magnet 61 and the core 30 low, the vibration 50 can be prevented from being deformed in a free state but a vertical movement force of the vibration part 60 is lowered as the intensity of an electromagnetic force generated by the core is weakened when a current is applied to the coil 20.

However, if the through-hole 35 is formed in the core 30 while the size of the core is made small as in the present invention shown in (c) of FIG. 2, the size of the area where the permanent magnet 61 and the core 30 face each other becomes smaller such that an attractive force between the permanent magnet 61 and the core 30 becomes weaker, whereby the permanent magnet 61 is minimally lowered toward the core 30 while a current is not applied to the coil 20 so that the vibration plate 50 can be prevented from being bent for a long time and plastically deformed.

In addition, because the size of the core 30 is large, a strong electromagnetic force may be generated when a current is applied to the coil 20.

In this regard, it may be thought that the intensity of an electromagnetic force generated by the core 30 may be significantly weakened because the through-hole 35 is formed in the core 30, the electromagnetic force generated by an electromagnet is stronger at a portion of the core 30 close to the coil 20 that at a central portion of the core 30, so that if a current is applied to the coil 20 even though the through-hole 35 is formed at a central portion of the core 30, a strong electromagnetic force is generated in the core 30.

As described above, according to the present invention, by forming the through-hole 35 in the core 30, the permanent magnet 61 may be minimally lowered toward the core 30 when a current is not applied to the coil 20, and when a current is applied to the coil 20, a strong electromagnetic force is generated in the core 30 such that a vertical movement force of the vibration part 60 can become higher.

In addition, if the width of the permanent magnet 61 becomes smaller than the width of the through-hole 35 while the permanent magnet 61 is disposed at an upper portion of the core 30, an operation between an electromagnetic force generated by the core 30 and a magnetic force generated by the permanent magnet 61 becomes mere, so that the vibration part 60 cannot be smoothly vertically moved.

Accordingly, the width of the permanent magnet 61 is made larger than the width of the through-hole 35, and preferably, the width of the permanent magnet 61 is equal to or larger than the width of the core 30.

The cover member 40 has an open-bottomed cylindrical shape, and covers an upper side of the base member 10.

Accordingly, the remaining configurations constituting the haptic actuator according to the present invention is disposed between the base member 10 and the cover member 40.

The vibration plate 50 is disposed at an upper portion of the core 30 to vertically move, and is formed of a plate spring and is mounted to the cover member 40.

The vibration plate 50 includes a mounting part 51 mounted to a central area of the cover member 40, and a coupling part 52 extending from the mounting part 51 and to which the vibration part 60 is mounted.

In detail, the mounting part 51 is fixedly mounted to a central area of a lower surface of an upper portion of the cover member 40 and the coupling part 52 is bent downwards at an outside of the mounting part 51 such that if the direction of a current applied to the coil 20 is changed, the vibration part 60 vertically vibrates while resiliently deforming the coupling part 52.

In this way, the mounting part 51 is fixedly mounted to a central area of the cover member 40 and the coupling part 52 is bent downwards at an outside of the mounting part 52 to be vertically resiliently deformed, whereby a space for installing the coil 20 or the vibration part 60 may be secured between the vibration plate 50 and the base member 10 without directly increasing the size of the haptic actuator.

The vibration part 60 is coupled to the vibration plate 50, and is disposed at an upper portion of the core 30 while being spaced apart from an upper surface of the core 30.

In the embodiment of the present invention, the vibration part 60 includes a permanent magnet 61 and a weight body 62.

The permanent magnet 61 is coupled to the weight body 62 to be spaced apart from a lower portion of the mounting part 51, and is disposed at an upper portion of the core 30 while being spaced apart from an upper surface of the core 30.

The permanent magnet 61 is polarized into an N pole and an S pole in a vertical direction in which the core 30 is disposed.

The weight body 62 has a hollow cylindrical shape, and is disposed about the permanent magnet 61 and is coupled to the vibration plate 50.

That is, the permanent magnet 61 is coupled to a central portion of the weight body 62, and the weight body 62 is coupled to a lower surface of the coupling part 52.

The weight body 62 is disposed to surround an outer peripheral surface of the coil while being spaced from an outer peripheral surface of the coil 20.

The weight body 62 is heavier than the permanent magnet 61 and thus functions to move the permanent magnet 61 better than the case when only the permanent magnet 61 vertically moves.

An impact absorption member 70 for preventing generation of noise due to a collision with the core 30 when the permanent magnet 61 vertically moves may be mounted on a lower surface of the permanent magnet 61 or an upper surface of the core 30.

Figure 3:
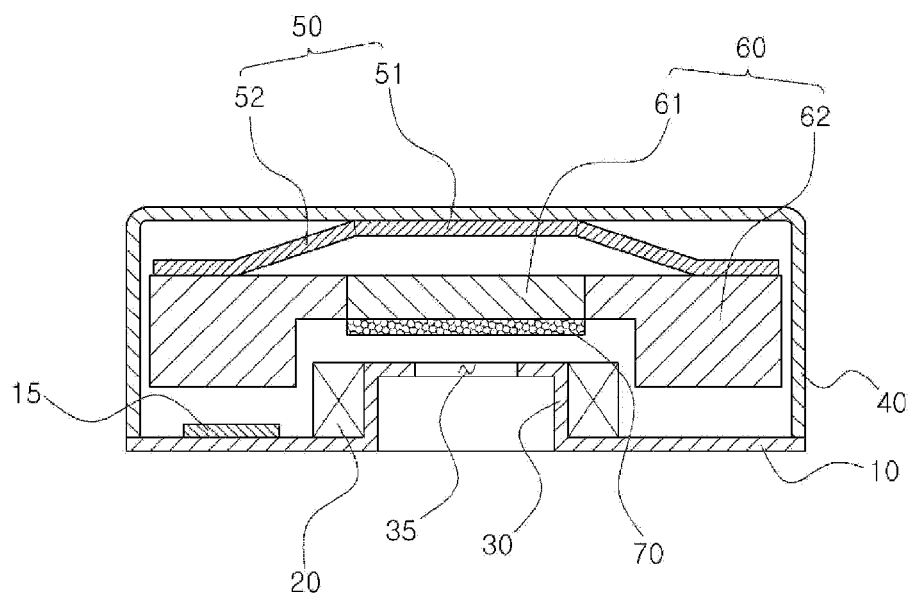
FIG. 3 is a sectional view of a haptic actuator according to a modified example of the present invention.

In FIG. 3, the impact absorption member 70 is mounted on a lower surface of the permanent magnet 61.

The base member 10, the core 30, the cover member 40, and the vibration plate 50 are all formed of a magnetic substance and are magnetically connected to each other.

Due to this, a magnetic force generated by the permanent magnet 60 is transferred to the vibration plate 50, the cover member 40, the base member 10, and the core 30, so that the vibration plate 50 may vertically move better when a current is applied to the coil 20.

Of course, the base member 10, the cover member 40, and the vibration plate 50 may not be formed of a magnetic substance.

In the above-configured haptic actuator according to the present invention, if the direction of a current periodically applied to the coil 20 is changed, an attractive force or a repulsive force is generated between a magnetic field generated through the core 30 disposed at a central portion of the coil 20 and a magnetic field generated by the permanent magnet 61, so that the vibration part 60 vertically moves while resiliently deforming the coupling part 52.

The haptic actuator according to the present invention is not limited to the above-described embodiment, but may be variously deformed without departing from the spirit of the present invention.

INDUSTRIAL APPLICABILITY

The haptic actuator according to the present invention can be embedded in an electronic device, such as a portable terminal, for generating vibrations, can be easily assembled while having a simple structure by mounting a core at a central portion of a hollow coil and disposing a permanent magnet at an upper portion thereof, and can generate a strong electromagnetic force.

The invention claimed is:

1. A haptic actuator comprising:
a base member;
a hollow cylindrical coil disposed on an upper surface of the base member;
a core formed in a center portion of the base member, the core having a through-hole vertically passing through the core, the hollow cylindrical coil surrounding the core;
a cover member covering an upper portion of the base member, the cover member having a lower surface facing the upper surface of the base member;
a vibration plate having a mounting part and a coupling part integrally extending from the mounting part and bent downwards towards the base member, wherein the mounting part is fixed to the lower surface of the cover member; and
a vibration part having a weight body and a permanent magnet fixed to a center portion of the weight body, wherein the weight body is fixed to the coupling part of the vibration plate,
wherein the permanent magnet is positioned directly above the core and spaced part from both the mounting part and the core, and
wherein the permanent magnet has a width larger than the diameter of the through-hole of the core, and simultaneously equal to or larger than the width of the core.

2. The haptic actuator of claim 1, wherein an impact absorption member is mounted on a lower surface of the permanent magnet or an upper surface of the core.

* * * * *